Patented Apr. 23, 1946

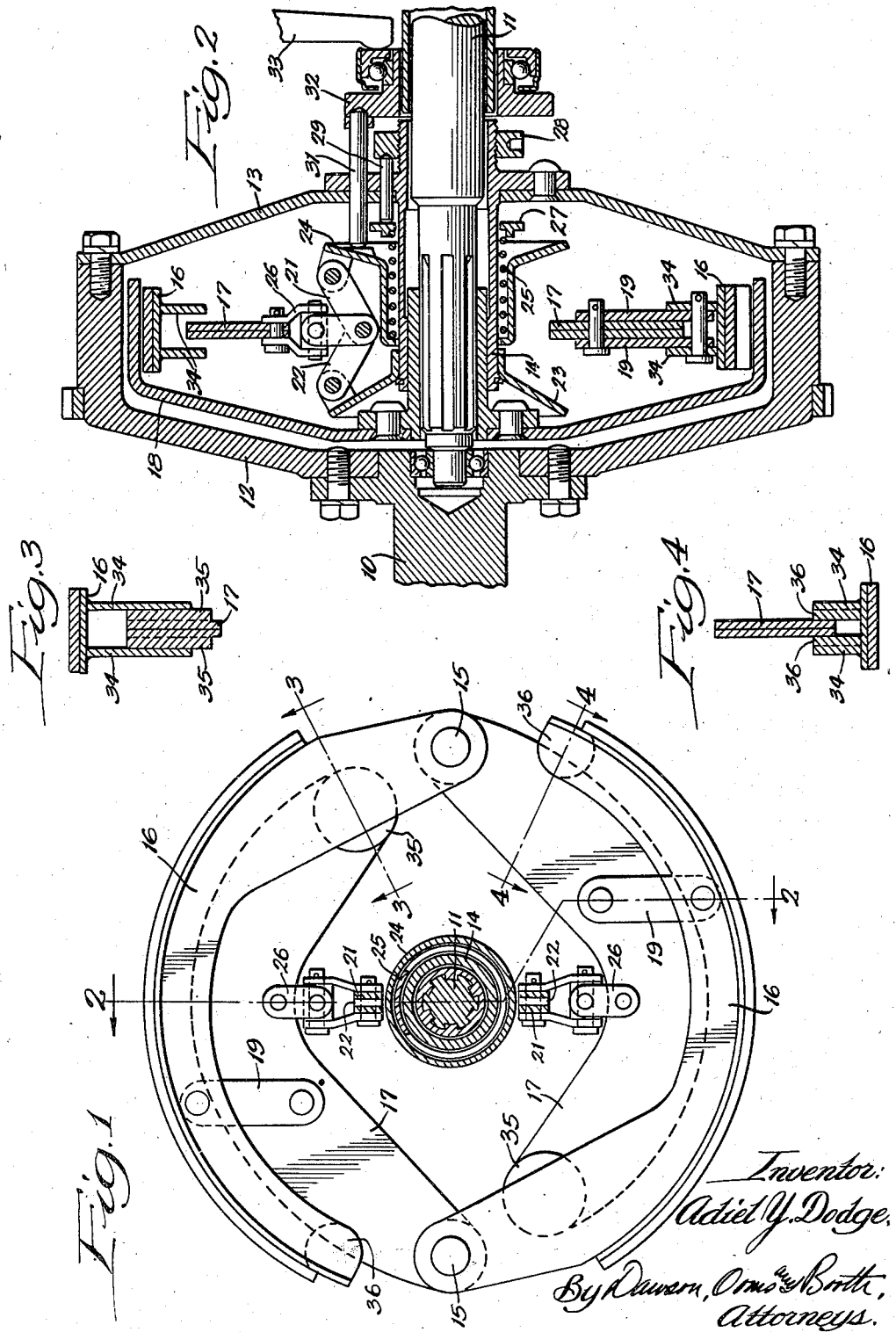

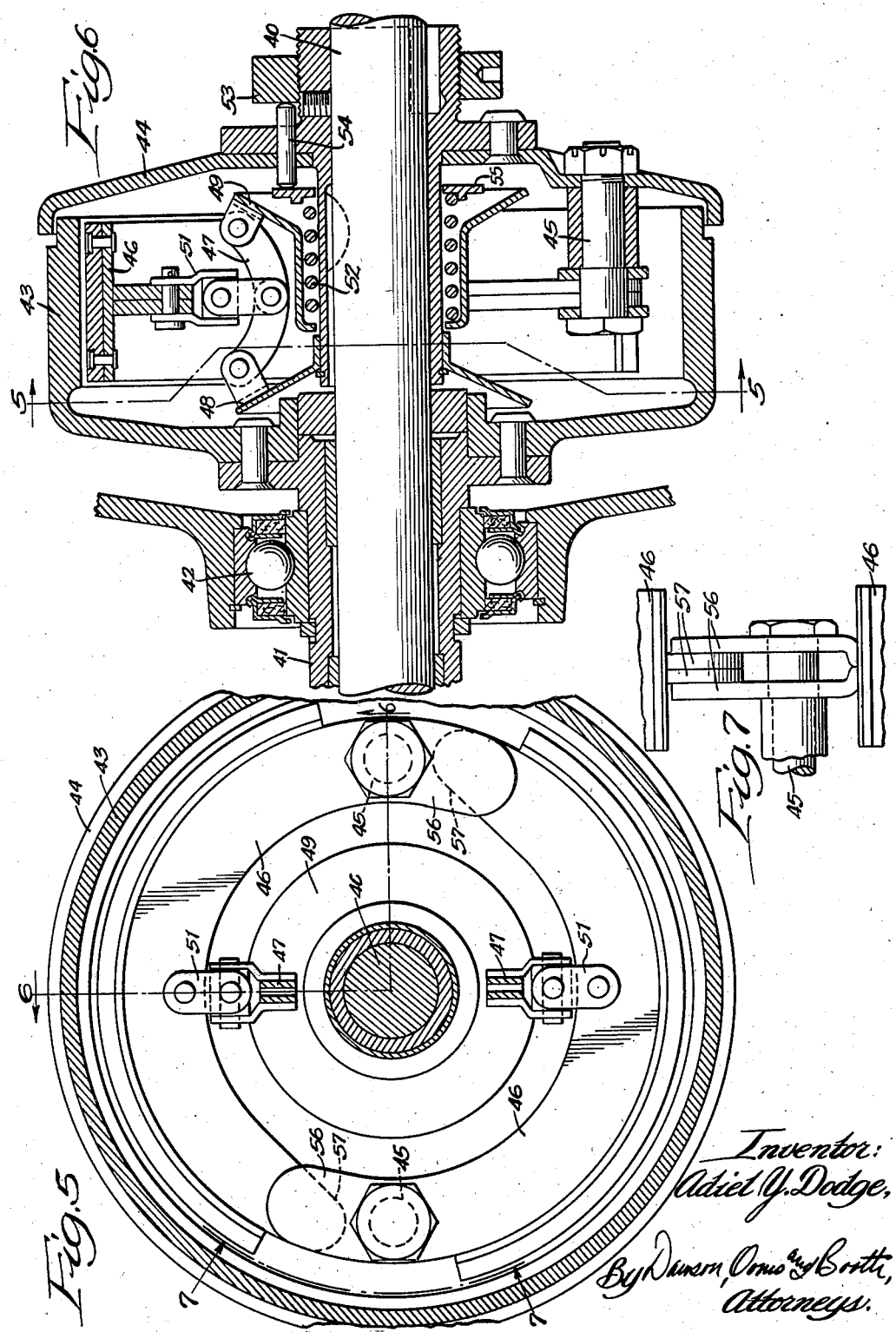

2,398,885

UNITED STATES PATENT OFFICE 2,398,885

SPEED RESPONSIVE CLUTCH

Adiel Y. Dodge, Rockford, Ill.

Application May 15, 1944, Serial No. 535,607

12 Claims. (Cl. 192—105)

This invention relates to speed responsive clutches and more particularly to friction type clutches for drivably connecting two rotatable members in response to the speed of one of the members.

One of the objects of the invention is to provide a clutch in which a pair of pivotally mounted elements slidably engage each other for mutually bracing and supporting each other. In one construction embodying the invention a pair of friction shoes are provided having slidably overlapping portions through which they brace each other. In another construction the shoes are actuated by pivotally mounted weights which slidably overlap with the shoes and support them.

Another object is to provide a speed responsive clutch in which the slip period may be controlled by design.

Another object of the invention is to provide a clutch in which the speed responsive elements are controlled by springs connected to the elements through a toggle linkage which changes the mechanical advantage of the elements over the spring as the elements move toward engaging position.

Still another object of the invention is to provide a speed responsive clutch which can be controlled manually at will to prevent its engagement.

The above and other objects and advantages of the invention will be more readily apparent from the following description when read in connection with the accompanying drawings, in which—

Figure 1 is an end view with parts in section of a clutch embodying the invention;

Figure 2 is a section on the broken line 2—2 of Figure 1;

Figures 3 and 4 are partial sections on the line 3—3 and 4—4 respectively of Figure 1;

Figure 5 is a view similar to Figure 1 of an alternative construction on the line 5—5 of Figure 6;

Figure 6 is a section on the broken line 6—6 of Figure 5; and

Figure 7 is a partial elevation of the clutch shoes on the line 7—7 of Figure 5.

The clutch shown in Figure 1 is adapted to connect a rotatable shaft 10 to a coaxial shaft 11, either of which may be the driving shaft. The shaft 10 is connected to a cover or casing member 12 which may form a fly wheel and has a cover plate 13 connected thereto carrying a sleeve 14 telescoping with the shaft 11.

The cover plate 13 carries a pair of spaced pivots 15 at diametrically opposite points. On each of the pivots 15 there is pivotally mounted a friction shoe 16 extending circumferentially toward the opposite pivot and a weight 17 likewise extending circumferentially toward the opposite pivot and lying radially within the shoes. It will be noted that the weight 17 pivoted on one of the pivots underlies the friction shoe which is mounted on the opposite pivot.

The weights are adapted to control the shoes 16 to move them into engagement with a drum 18 carried by the shaft 11. For this purpose links 19 are provided connected at one end to the weights adjacent their pivotal mounting on the pivots 15 and at the opposite end to the friction shoes adjacent the free ends thereof. With this construction as the weights tend to move out they will act through the links 19 to force the shoes outwardly into driving engagement with the drum to connect the shafts 10 and 11.

The weights are controlled through a toggle linkage including a pair of links 21 and 22 pivotally connected at one end of each. The free end of the link 22 is pivoted to a bracket on a collar 23 which is fixed against longitudinal movement on the sleeve 14. The link 21 is pivoted to a similar collar 24, which is slidable axially on the sleeve 14 and which is urged toward the collar 24 by a spring 25. The central portion of the toggle linkage is connected through a universal joint construction 26 to the central portion of the weights, the linkage being so arranged that the central pivot lies radially inward of the outer ends of the linkage.

The spring 25 butts against a collar 27, which is slidable on the sleeve 14 and which may be adjusted through a threaded nut 28 threaded on an extension of the sleeve 14 and connected to the collar through thrust pins 29. The collar is preferably also controllable manually through thrust pins 31 engaging the collar 24 and a collar 32 which may be moved to the left, as seen in Figure 2, by a manually controlled yoke 33.

In operation of this construction with the parts in the position shown, the friction shoes are out of engagement with the drum and are held inwardly by the spring 25 acting through the toggle linkage. As the speed of the shaft 10, and accordingly of the shoes and weights, increases the weights exert an outward force on the center of the toggle linkage. When this force exceeds the holding force of the spring 25 the weights start to move out to move the shoes into engagement with the drum. As soon as this motion occurs the angle of the toggle links changes to increase the mechanical advantage of the weights over the spring, so that the shoes will move into engagement with the drum without any chattering. This effect is further increased by the change of angle of the links 19 which increases the mechanical advantage of the weights over the shoes. Therefore, above the critical speed the shoes will be moved quickly to engagement with the drum and will stay in driving engagement therewith until the speed is reduced to a value lower than that required to initiate the engaging operation.

According to one important feature of the invention the shoes and weights are so constructed that they will support each other laterally to prevent any tilting or cocking thereof. For this purpose the shoes are formed with spaced inwardly extending flanges 34 between which the weights are movable. The spacing between the flanges is greater than the thickness of the weights, as seen in Figure 2, to provide room for the links 19. The links therefore assist in guiding the weights and shoes laterally. To provide additional support between the weights and shoes enlarged bearing portions are provided adjacent the free ends of each of the weights and shoes to form a sliding interengagement therebetween. As shown, the free ends of the weights are provided with circular bearing portions 35 thickening the end portion of the weights sufficiently to form a sliding fit with the shoe flanges 34. The shoes at their free end are formed with similar bearing portions 36 forming a sliding fit with the outer surfaces of the weights. With this construction each shoe slidably interfits with a weight pivoted on a spaced pivot so that adequate lateral support is provided for both the shoes and the weights during their operation.

In the construction shown in Figures 5 to 7 the clutch is adapted to connect a circular shaft 40 to a sleeve shaft 41 coaxial with the shaft 40. In this construction the shaft 41 is rotatably supported in bearings 42 and carries a drum 43. The shaft 40 carries a laterally extending flange 44 adjacent the drum 43 which has therein a pair of diametrically spaced pivots 45. An elongated friction shoe 46 is pivoted adjacent one end of each of the shafts 45 and extends toward the opposite pivot. The shoes 46 are movable into engagement with the drum 43 in response to centrifugal force on the shoes themselves.

The shoes 46 are controlled through a toggle linkage 47 similar to the linkage 21—22 of Figures 1 and 2, which is connected at one end to a collar 48 fixed against axial movement relative to the shaft 40 and at its opposite end to a collar 49 movable axially of the shaft 40. The central portion of the linkage is connected through a universal joint mechanism 51 to the shoes 46 and a spring 52 urges the collar 49 toward the collar 48 to hold the shoes out of engagement with the drum. The spring 52 may be adjusted through a nut 53 engaging a pin 54 which places a slidable collar 55 against the spring to form an adjustable abutment therefor. Operation of this mechanism is similar to that of Figures 1 and 2.

In order that the shoes may mutually brace and support each other against lateral and tilting movement, each shoe is formed with a bifurcated portion 56 extending beyond its pivot 45 in in a direction opposite to the main portion of the shoe. The free end of the opposite shoe is formed with a nose portion 57 constituting an extension of its flange which slidably interfits in the bifurcated portion 56 of the opposite shoe. In this way the shoes are slidably interconnected for laterally bracing and supporting each other.

While two embodiments of the invention have been shown and described in detail, it will be understood that these are illustrative only and are not to be taken as a definition of the scope of the invention, reference being had for this purpose to the appended claims.

What is claimed is:

1. A clutch for connecting two rotatable members comprising a drum carried by one of the members, an arcuate friction shoe operatively connected to the other member and movable into engagement with the drum in response to the speed of the other member, a collar slidable axially of the axis of rotation of the members, a toggle linkage pivoted at one end to the collar and at its other end to a part fixed against axial movement relative to the other member, means connecting the intermediate portion of the toggle linkage to the friction shoe, and a spring urging the collar axially in a direction to move the shoe out of engagement with the drum, the toggle linkage changing its angle as the shoe moves toward engagement with the drum to increase the mechanical advantage of the shoe over the spring.

2. A clutch for connecting two rotatable members comprising a drum carried by one of the members, an arcuate friction shoe operatively connected to the other member and movable into engagement with the drum in response to the speed of the other member, a collar slidable axially of the axis of rotation of the members, a second collar spaced axially from the first named collar, a toggle linkage pivoted at its ends to the collars respectively, means connecting the central part of the linkage to the friction shoe, the toggle linkage sloping inwardly from its ends toward said central portion, and a spring urging the collars relatively together to urge the shoe out of engagement with the drum.

3. A clutch for connecting two rotatable members comprising a drum carried by one of the members, an arcuate friction shoe operatively connected to the other member and movable into engagement with the drum in response to the speed of the other member, a collar slidable axially of the axis of rotation of the members, a second collar fixed against axial movement relative to the other member, a toggle linkage connected at its ends to the collars, means connecting the central part of the toggle linkage to the friction shoe, a spring urging the first named collar in a direction to move the shoe out of engagement with the drum, and manually operable means engaging the first named collar to urge it in a direction to move the shoe out of engagement with the drum.

4. A clutch for connecting two rotatable members comprising a drum connected to one of the members, a friction shoe pivoted on the other member and movable into engagement with the drum, a weight pivoted on the other member to move in response to the speed thereof, means connecting the weight and the shoe to move the shoe into engagement with the drum as the weight moves out in response to centrifugal force, a collar slidable axially of the members, a second collar spaced axially from the first named collar, a toggle linkage pivoted at its ends to the collars, means connecting the central portion of the linkage to the weight, and a spring urging the first named collar axially in a direction to move the weight out of engagement with the drum.

5. A clutch for connecting two rotatable members comprising a drum carried by one of the members, a pair of diametrically spaced pins carried by the other member, a weight and a friction shoe pivoted to each of the pins, links connecting the weights respectively to the shoes pivoted on the opposite pins to move the shoes into engagement with the drum in response to centrifugal force on the weights, a pair of collars movable relatively together and apart axially of the members, a pair of toggle linkages pivoted at their opposite ends to the collars, means connecting the central parts of the toggle linkages to the weights respectively, and a spring urging the collars relatively in a direction to move the weights radially inward to disengage the shoes from the drum.

6. A clutch for connecting two rotatable members comprising a drum carried by one of the members, a pair of spaced pivots on the other member, a friction shoe pivoted adjacent one end on one of the pivots and movable into engagement with the drum in response to the speed of said other member, and an elongated part pivoted adjacent one end on the other of the pivots and extending toward said one of the pivots, the shoe and the part having slidable interengaging portions whereby they mutually brace each other against tilting.

7. A clutch for connecting two rotatable members comprising a drum carried by one of the members, a pair of spaced pivots on the other member, a friction shoe pivoted adjacent one end on one of the pivots and movable into engagement with the drum in response to the speed of said other member, and an elongated part pivoted adjacent one end on the other of the pivots and extending toward said one of the pivots, the shoe having spaced flange portions and the part slidably fitting between the spaced flange portions so that the shoe and the part mutually brace each other.

8. A clutch for connecting two rotatable members comprising a drum carried by one of the members, a pair of diametrically spaced pivots on the other member, a pair of friction shoes pivoted on the pivots respectively and movable into engagement with the drum in response to the speed of the other member, the shoes having slidably interengaging parts whereby they mutually brace each other.

9. A clutch for connecting two rotatable members comprising a drum carried by one of the members, a pair of diametrically spaced pivots on the other member, a pair of friction shoes pivoted on the pivots respectively and movable into engagement with the drum in response to the speed of the other member, each of the shoes having a yoke portion extending beyond its pivot and slidably engaging the end of the other shoe.

10. A clutch for connecting two rotatable members comprising a drum carried by one of the members, a pair of diametrically spaced pivots on the other member, a pair of friction shoes pivoted on the pivots respectively and movable into engagement with the drum in response to the speed of the other member, a pair of weights pivoted on the pivots respectively, means connecting the weights to the shoes to urge the shoes into engagement with the drum in response to centrifugal force of the weights, the weight on each of the pivots slidably engaging the shoe on the other pivot so that they mutually brace each other.

11. A clutch for connecting two rotatable members comprising a drum carried by one of the members, a pair of diametrically spaced pivots on the other member, a pair of friction shoes pivoted on the pivots respectively and movable into engagement with the drum in response to the speed of the other member, a pair of weights pivoted on the pivots respectively, means connecting the weights to the shoe to urge the shoes into engagement with the drum in response to centrifugal force of the weights, the shoes having spaced flange portions slidably fitting over the weights whereby the weights and shoes mutually brace each other.

12. A clutch for connecting two rotatable members comprising a drum carried by one of the members, a pair of diametrically spaced pivots on the other member, a pair of friction shoes pivoted on the pivots respectively and movable into engagement with the drum in response to the speed of the other member, a pair of weights pivoted on the pivots respectively, means connecting the weights to the shoes to urge the shoes into engagement with the drum in response to centrifugal force of the weights, the shoes having spaced inwardly extending flanges between which the weights extend, and spacers adjacent the free ends of the weights and shoes to provide sliding engagement between the weights and flanges so that the weights and shoes mutually brace each other.

ADIEL Y. DODGE.